United States Patent
Kroken et al.

(10) Patent No.: US 12,520,827 B2
(45) Date of Patent: Jan. 13, 2026

(54) FISH CAGE DEVICE COMPRISING SPHERICAL FISH CAGE

(71) Applicant: Geir Kroken, Nordfjordeid (NO)

(72) Inventors: Geir Kroken, Nordfjordeid (NO); Elias N. Kroken, Nordfjordeid (NO)

(73) Assignee: Geir Kroken, Nordfjordeid (NO)

( * ) Notice: Subject to any disclaimer, the term of this patent is extended or adjusted under 35 U.S.C. 154(b) by 160 days.

(21) Appl. No.: 18/262,383

(22) PCT Filed: Jan. 24, 2022

(86) PCT No.: PCT/NO2022/050019
§ 371 (c)(1),
(2) Date: Jul. 21, 2023

(87) PCT Pub. No.: WO2022/158984
PCT Pub. Date: Jul. 28, 2022

(65) Prior Publication Data
US 2024/0315216 A1    Sep. 26, 2024

(30) Foreign Application Priority Data
Jan. 25, 2021    (NO) .................................. 20210090

(51) Int. Cl.
    *A01K 61/60*    (2017.01)
(52) U.S. Cl.
    CPC .................................. *A01K 61/60* (2017.01)
(58) Field of Classification Search
    CPC ......... A01K 61/60; A01K 63/00; A01K 61/00
    USPC ............................. 43/103, 102; 119/215, 223
    See application file for complete search history.

(56) References Cited

U.S. PATENT DOCUMENTS

| 4,257,350 A | 3/1981 | Streichenberger |
| 4,312,296 A | 1/1982 | Stelleman et al. |
| 4,744,331 A * | 5/1988 | Whiffin .................. A01K 29/00 119/223 |

(Continued)

FOREIGN PATENT DOCUMENTS

| CN | 104255604 A * | 1/2015 | ............. A01K 61/00 |
| CN | 206933019 U | 1/2018 | |

(Continued)

OTHER PUBLICATIONS

International Search Report and Written Opinion dated Mar. 31, 2022 for International Patent Application No. PCT/NO2022/050019.

Primary Examiner — Morgan T Jordan
Assistant Examiner — Carly W. Lynch
(74) Attorney, Agent, or Firm — Alix, Yale & Ristas, LLP

(57) ABSTRACT

A closed, spherical cage device suitable for farming fish in a position floating in water has a pattern of polygons divided along boundary lines, the boundary lines having tubular elements which together form a spherical skeleton. A plurality of panes are covered by at least one layer of seine net, netting, or the like, the tubular members containing at least one inflatable buoyancy member having fluid communication to a reservoir of pressurized gas. A control unit is arranged to regulate the amount of gas in the buoyancy elements, the tubular elements being connected at nodes by means of sleeves and finger brackets and the tubular elements being arranged to allow inflow of water in the parts of the tubular elements not occupied by the buoyancy element.

20 Claims, 7 Drawing Sheets

(56) References Cited

U.S. PATENT DOCUMENTS

| | | | |
|---|---|---|---|
| 5,251,571 A | 10/1993 | Willinsky et al. | |
| 5,566,499 A * | 10/1996 | Washecka | A01K 69/10 43/103 |
| 6,481,378 B1 | 11/2002 | Zemach | |
| 8,424,491 B2 | 4/2013 | Page | |
| 11,516,996 B1 * | 12/2022 | DePaola | A01K 61/60 119/239 |
| 2002/0162515 A1 * | 11/2002 | Boyd | A01K 61/60 119/223 |
| 2006/0288950 A1 | 12/2006 | Cartwright et al. | |
| 2011/0126447 A1 * | 6/2011 | Thorvardarson | A01K 61/10 43/103 |
| 2011/0146559 A1 | 6/2011 | Kania et al. | |
| 2019/0029233 A1 | 1/2019 | Lyngoy | |

FOREIGN PATENT DOCUMENTS

| | | | | |
|---|---|---|---|---|
| CN | 111700015 A | | 9/2020 | |
| CN | 111762293 A | * | 10/2020 | B63B 35/44 |
| KR | 102089294 B1 | | 3/2020 | |
| WO | 8703170 A1 | | 6/1987 | |
| WO | 2006050386 A2 | | 5/2006 | |
| WO | 2021075979 A1 | | 4/2021 | |

\* cited by examiner

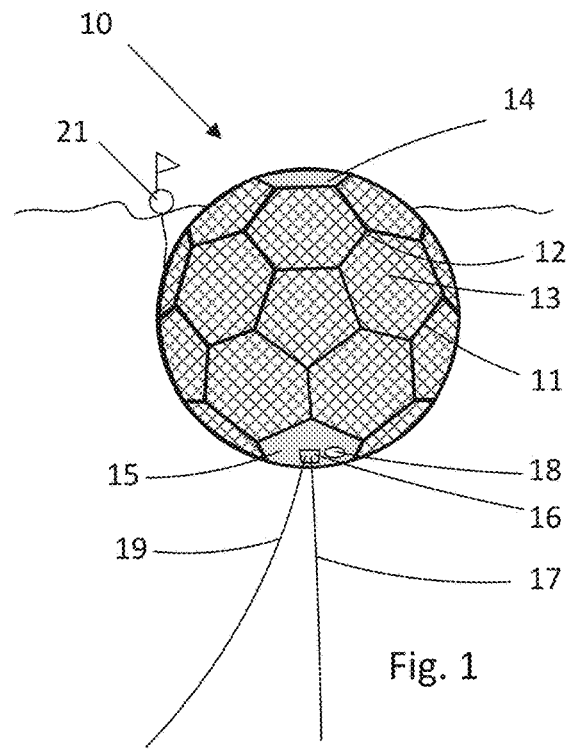
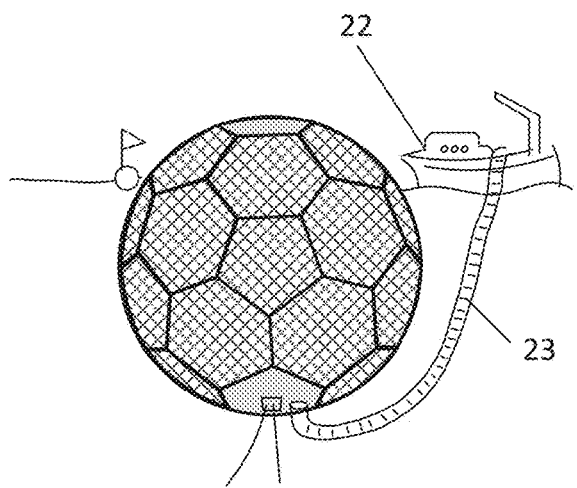
Fig. 1 Fig. 2
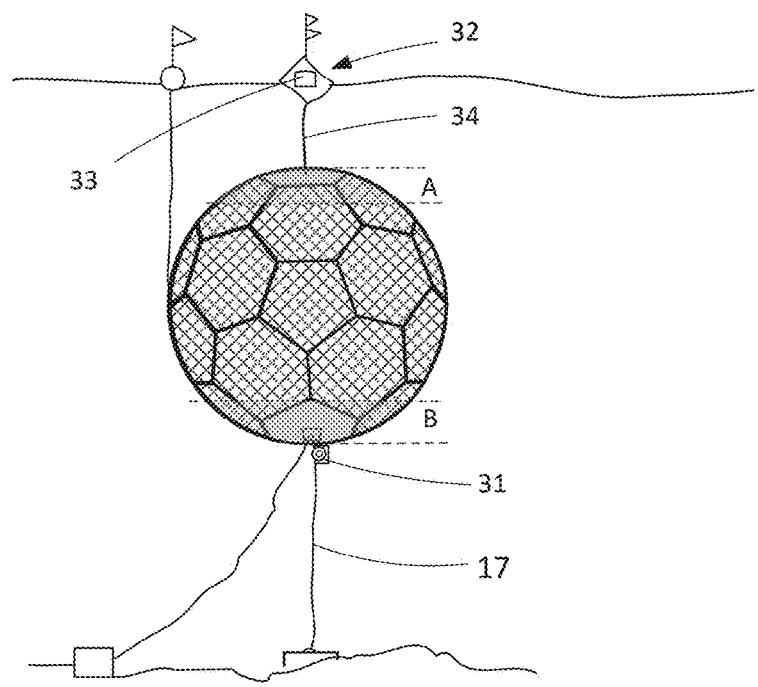
Fig. 3

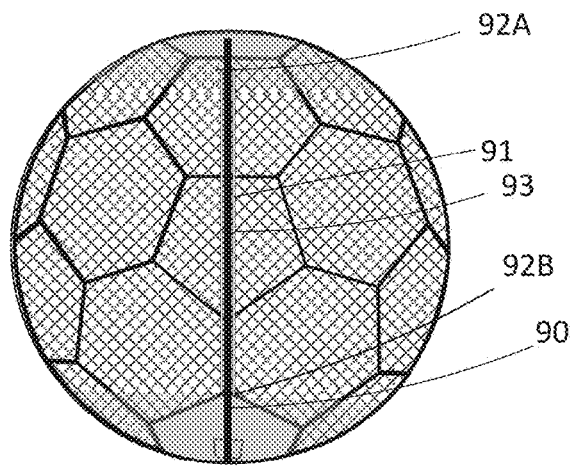
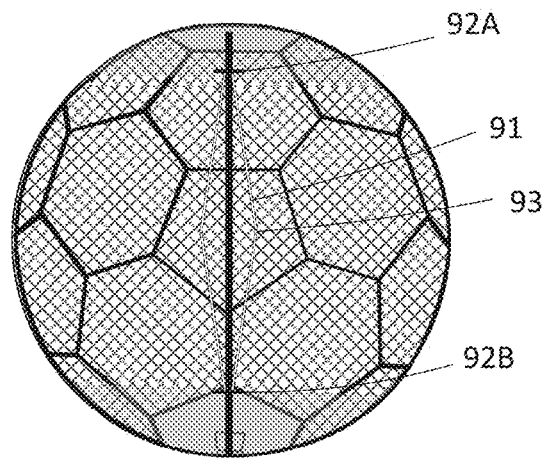
Fig. 9A                                Fig. 9B
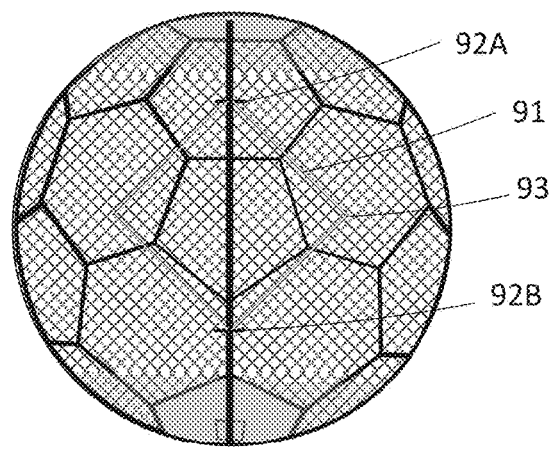
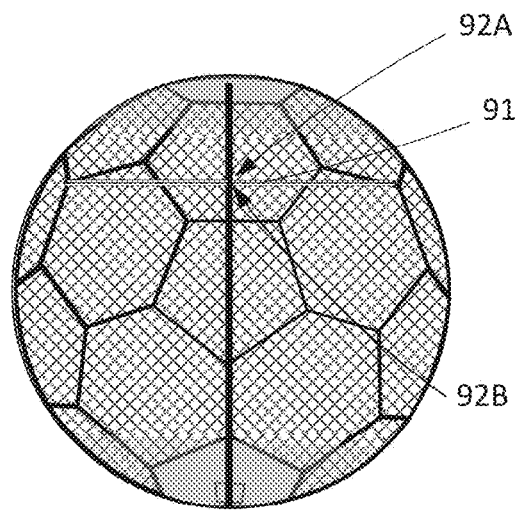
Fig. 9C                                Fig. 9D
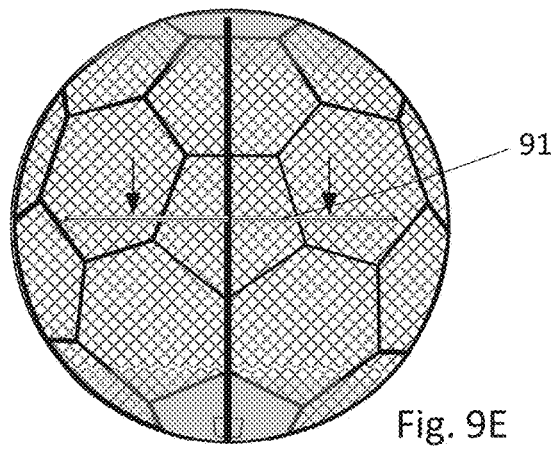
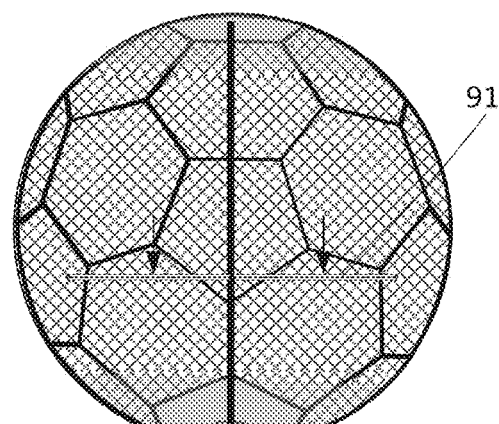
Fig. 9E                                Fig. 9F

FISH CAGE DEVICE COMPRISING SPHERICAL FISH CAGE

BACKGROUND

The disclosed embodiments relate to a cage device comprising a closed, spherical cage for fish rearing.

Industrial fish farming has long been a major "industry" in many countries, and both the size and number of fish farms have grown considerably. The vast majority of cages used commercially are open cages located in the sea and where the fish that are reared are separated from the surroundings by a single layer of seine net that hangs like a large cylinder in the sea, closed at the bottom but open at the top. The seine net hangs from buoyancy elements, which form a floating ring on the surface. Under ideal conditions, this works well, but it is vulnerable to damage and loss of fish in bad weather, and has little protection against algal bloom and not least salmon lice. Billions of Norwegian kroner are lost annually in the form of fish that escape and which also leads to an unwanted strain on the wild fish in the form of disease etc.

Existing facilities furthermore pollute the seabed under the facilities and the surrounding areas, because they lack effective solutions for collecting waste from feed and excrement.

Due to the mentioned disadvantages, a number of measures have been proposed to overcome these problems or disadvantages, such as moving the entire facilities ashore or using facilities that are more closed and can provide better protection against one or more of the mentioned disadvantages. So far, no proposals have been made that have proved sufficiently simple and inexpensive to really compete with existing facilitiesin, despite the fact that they technically show advantages over the open cages.

U.S. Pat. No. 8,424,491 B2 discloses a closed, substantially spherical cage structure which is designed as triangular, rigid beam sections based on beam elements of plastic or metal. The beam elements can enclose conduits or inflatable elements. The system is submersible so that the entire cage can be submerged under water if necessary. According to the patent, cages of different sizes can be built up of the same basic components, for example by using from 80 and even up to 720 composite triangular elements, but since the elements are rigid in nature, extreme precision is required to join these at such an angle that the desired size. It might therefore be desirable to design a system which is more flexible and which allows the assembly of the components to take place without having to ensure such a degree of accuracy.

From Norwegian patent no. 332 518 a spherical cage is known based on a supporting structure of beams assembled to form polygons with a net in the form of removable panels. Fixed and inflatable buoyancy elements will be included in several of the beams, while some beams may contain only fixed buoyancy elements, only inflatable buoyancy elements or none of the parts.

Among other technology known in the art, reference is made to SE 450 866 and to U.S. Pat. No. 5,251,571 A.

Provided herein is a cage for farming fish rearing which is simple in its construction, easy to adapt to different sizes and simple and safe to operate, including having low operating and maintenance costs, and which is able to withstand storms with minimal risk of damage.

Also provided is a cage which has good safety against escape and which has an inherent ability to protect fish against lice and algae in the event of strong algae bloom, and which pollutes the environment to a lesser extent.

The disclosed embodiments are easy to anchor and provide good opportunities for moving fish into and out of the cage.

SUMMARY

By "cage device" is meant that the inventive embodiments are not exclusively limited to the cage itself, but also with externally connected physical equipment and a control unit which is used, among other things, to regulate the cage's position in the sea.

By "closed" as is used herein is meant that there are both roofs and walls in the cage, however, it should not be interpreted as any part of it being waterproof or airtight unless clearly stated.

The inventive embodiments provide a cage which is unique in its construction and which solves the mentioned challenges, among other things in that it can be immersed completely under water which is a great advantage in bad weather or as a measure among others to reduce the nuisance caused by salmon lice.

The submersible function of the cage enables the installation of coastal farming facilities, where conventional cage systems are unable to withstand the strong natural forces to which the facilities are occasionally exposed in strong winds and large waves.

The submerged cage as disclosed herein also offers advantages in rearing in that upper water masses can be avoided in critical situations, such as in the case of dangerous algae bloom, in lice infestations, or in the release of environmental toxins. Other critical situations can be, for example, oil spills caused by discharges from the oil industry or accidents at sea.

Furthermore, the system with its adjustable buoyancy/ballast can be controlled so that the cage can be rotated in the sea so that any part of the cage can be oriented above water level whenever desired, for example when cleaning, maintaining or installing new equipment, transportation channel for fish or the like.

The disclosed embodiments comprise a closed cage construction, which provides a number of advantages over currently used conventional cage constructions. The closed shape offers obvious advantages over existing applied solutions, due to the fact that the risk of reared fish escaping the cage is significantly reduced through the cage being closed. According to a preferred embodiment, the cage has a double net solution, which, among other things, allows for continuous monitoring of several operating parameters, including damage to the net with the risk of escape. The net is divided into panes/sections for each one of the cage's construction elements/panes, and is individually attached to buoyancy elements. The fact that the net is divided into sections gives a significant advantage over conventional cages with large and heavy nets. The advantage of smaller net sections is that this method provides easier assembly and service due to weight, size and requirements for tools, for otherwise heavy operations as is the case today. If desired, the solution with net sections provides the opportunity of having additional layers of net, or other membrane types if this is considered expedient.

The cage's construction with the possibility of at least two layers of net (or net plus membrane), means that one can mount a filter function with a fabric/membrane as the outer layer, as well as the possibility of controlling and monitoring the water masses between the outer and the inner net sections.

It is thus within the scope of the invention that the cage exhibits an inner, relatively fine-mesh net preventing fish from escaping, and an outer, more coarse-mesh net preventing predatory fish from penetrating the cage.

The cage construction makes it possible to move it by towing even if the cage is filled with fish. Moving cages with fish inside has proven to be desirable for the industry from an operational and safety perspective.

Sizing of the cage with respect to its diameter can be done by selecting tubular elements with different lengths and/or by changing the geometry of the finger brackets so that the curvature generally becomes smaller or larger at each node.

Compared to the closed structure known from U.S. Pat. No. 8,424,491 B2, the herein described cage is lighter, easier to size, and allows the use of more than one layer of net yarn or other type of "membrane" against the environment. desired. While at each node of the cage according to U.S. Pat. No. 8,424,491 there are four or five rigid beam elements which meet, in the disclosed embodiments, there are three pipe elements which meet and which are easily arranged via a separate sleeve into a prefabricated finger bracket which makes the mounting in principle equal simple as setting up a tent. While the finished cage is soft, resilient and flexible, the skeleton of the cage of U.S. Pat. No. 8,424,491 B2 is rigid. It is not a given that one cage is better than the other in all conditions and in all contexts, but they are different and have, despite the common features, fundamentally different properties.

BRIEF DESCRIPTION OF THE DRAWINGS

In the following, the invention will be described in more detail in the form of some selected, non-limiting embodiments, with reference to the accompanying drawings.

FIG. 1 is a schematic side view of a cage according to the disclosure.

FIG. 2 is a schematic side view of the disclosed cage during an operation.

FIG. 3 is a schematic side view of the disclosed cage in a submerged state.

FIGS. 9A-9F show a further advantageous feature of the disclosed embodiments in different positions.

DETAILED DESCRIPTION

Figure 4:
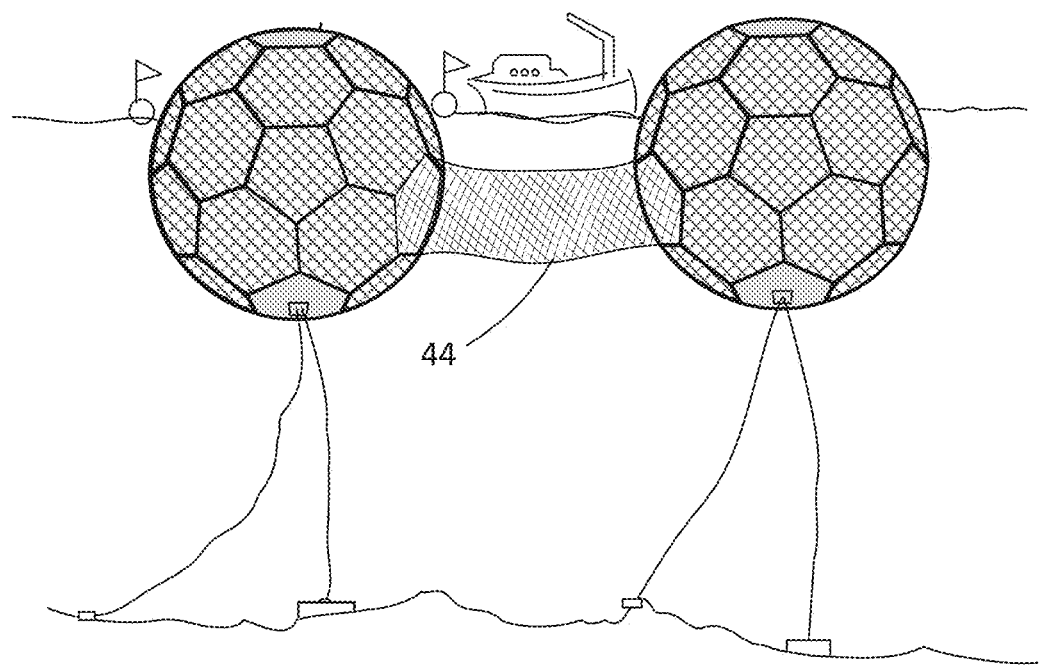
FIG. 4 is a schematic side view of two of the disclosed cages during the execution of an operation.

FIG. 1 shows a closed, spherical cage 10 floating deep in the sea, with the top projecting above the water surface. The spherical shape is obtained through a number of tubular elements 11 mounted together in nodes 12 which together with the tubular elements 11 delimit panes 13 of polygons. In the embodiment shown, the polygons are a combination of pentagons and hexagons. Most of the panes are covered with nets in at least one layer.

The upper pane of the cage is covered by a top plate 14. The top plate may be impervious or perforated, but typically constitutes a rigid element as explained in connection with another figure. The lower pane is covered by a bottom plate 15 provided with further details, including a fastening device 16 for a mooring line 17 and a hatch 18 for discharging waste from the cage. The hatch 18 is typically equipped with means for opening and closing by means of a control unit. A safety line 19 is also shown as a supplement to the mooring line 17. A buoy 21 with flag, light or other marking, is attached to the cage to make it easily visible.

As is explained in the following, buoyancy elements (one or more) are arranged for connection in each tubular element 11, which makes it possible to place the cage high or low in the water.

FIG. 2 shows the cage from FIG. 1 in a situation where a service boat 22 has arrived and connected a drain hose 23 to the hatch 18 to pump out solid waste from the lower part of the cage. In practice, one end of the drain hose 23 can normally be connected to the hatch 18 while the other end is attached to the upper part of the cage so that it can be easily connected to the pump on board the boat without requiring any connection to be made under water. The drain hose 23 may alternatively be connected to a collecting device, for example in the form of an impervious bag/container on the sea bottom for temporary collection and storage.

FIG. 3 shows a situation where the disclosed cage is pulled completely under water by means of a winch 31 and preferably by means of an adapted regulation of the buoyancy in at least some of the buoyancy elements. In a zone A at the top of the cage, an airtight fabric is arranged which ensures that an air pocket accompanies the cage when it is pulled down. For example, in zone A, solar panels can be fitted for storage/supply of energy so that the cage is at least partially self-supported with energy.

At the bottom of the cage, in a zone B, an impervious fabric is typically arranged for collecting solid waste until it is discharged via the hatch 18. In the submerged state a special buoy 32, typically equipped with battery, communication unit and a central control unit 33, will be able to transfer information to and from the cage, as well as to control certain parameters on the cage as discussed below. For example, the control unit 33 may be programmed to automatically lower the cage under water when wind strength and/or wave height exceeds certain levels. This can be done by starting the winch 31 and adjusting the buoyancy using buoyancy elements described below. The control unit 33 is arranged to be able to adjust the length of the mooring line 17 so that the cage can be placed at the surface when desired and so that it can be placed more than 10 meters below the water surface when desired.

The communication unit in the buoy 32 can provide current information about the condition of the cage and the position of the cage, as well as allow an operator to override the automatics. The buoy 32 is shown connected to the cage with a cable 34 for transmission of electricity, air and gas and optionally communication, while communication to the operator preferably takes place wirelessly. The winch 31 can, if desired, be operated manually, but is preferably controlled by the control unit 33 which can automatically implement various measures based on external parameters, such as wind strength, wave height etc.

One or more of the communication unit, the control unit and the battery may also optionally be arranged watertight on the top plate 14.

FIG. 4 shows schematically how a tubular net 44 can be connected to a respective pane in two cages placed close to each other. This can be done to move fish from one cage to another, for removing and controlling fish, or for example in need of major maintenance operations. The otherwise closed panes 13 of seine nets must for the purpose be loosened at least partially in the relevant squares to give the fish access to pass, or preferably a device for opening and closing being controlled by the control unit.

Figure 5:
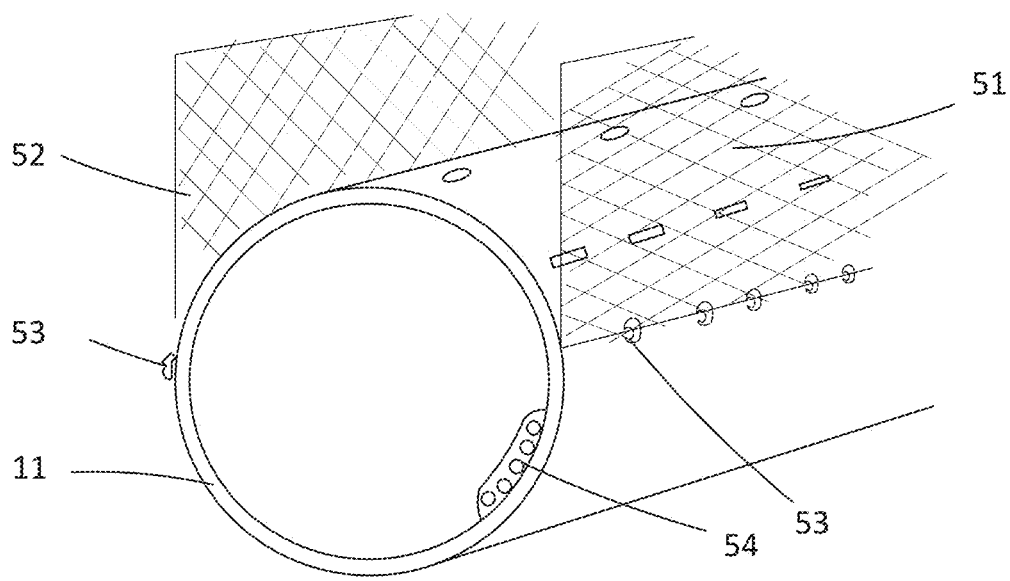
FIG. 5 is a perspective view of a tubular element and other elements of a cage according to the disclosure.

FIG. 5 shows a bit of a tubular element 11 with an inner seine net 51 on one side and an outer seine net 52 on the opposite side, fastened with fastening means 53. Inside the tubular element 11, a cable gate 54 is shown which can contain a number of pipes for supplying air/gas to buoyancy elements as well as electricity for lights, cameras etc. and for the transmission of control signals.

Figure 6A:
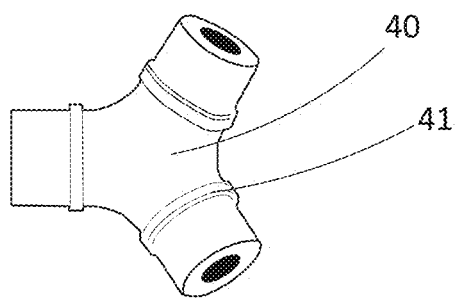
FIG. 6A shows an embodiment of a finger bracket according to the disclosure.

FIG. 6A shows a three-finger finger bracket 40 used to form nodes between the tubular members of the disclosed cage. The finger bracket typically has a slight angular change between each finger so that if you place an imaginary plane through the center of two of the fingers, the third finger will be outside the plane. This contributes to the curvature of the surface formed by assembling a cage, so that a ball surface can be obtained without curving the tubular elements 11 between the finger brackets. FIG. 6A shows the finger bracket 40 from its concave side, i.e. the side which in mounted condition will face the cage. Each finger on the bracket is equipped with a fastening device such as an annular flange 41 suitable for locking an adapted sleeve.

Figure 6B:
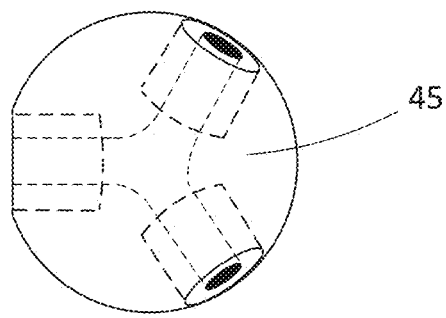
FIG. 6B shows an alternative embodiment of a finger bracket according to the disclosure.

FIG. 6B shows a finger bracket 45 with an interior corresponding to the finger bracket shown in FIG. 6A, but with an outer shape which is substantially spherical. It works in the same way as the finger bracket 40, but the attachment to the sleeve can be done in another way, for example with an external bayonet attachment or screw threads.

Figure 6C:
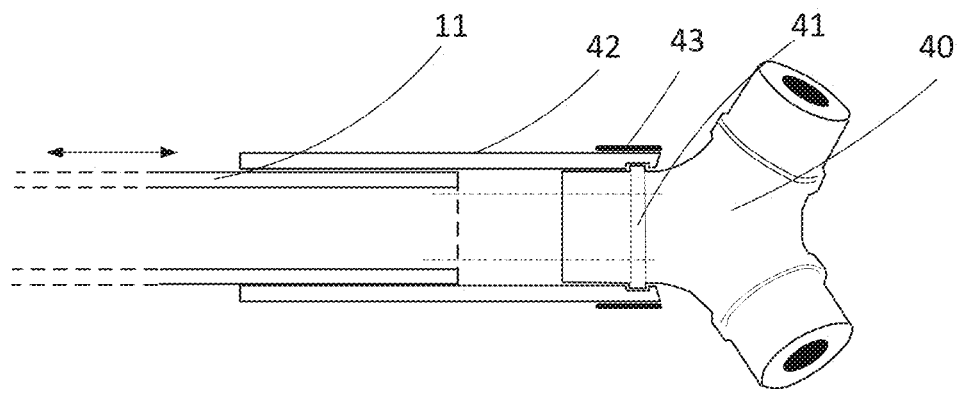
FIG. 6C shows an assembly of a finger bracket, a sleeve and parts of a tubular element according to the disclosure.

FIG. 6C shows a (partial) section through a tubular element 11 which is connected to a finger bracket 40 by means of a sleeve 42. The sleeve 42 is fixedly attached to the finger bracket 40 by the flange 41, possibly secured with a tension-band 43, while the tubular element 11 can slide back and forth inside the sleeve 42 depending on external influences on the cage. The sleeve is of such a length that the tubular element cannot slide completely out of the sleeve even under severe stress. The seine net itself, which covers the cage in at least one, preferably two layers, helps to limit the freedom of movement of the tubular element so that it cannot slide all the way out of the sleeve.

As explained above, the assembly can take place without the use of welding, bolts or threads/screwing.

The buoyancy element that is typically present in the tubular element 11 is not shown in FIG. 6.

Figure 7A:
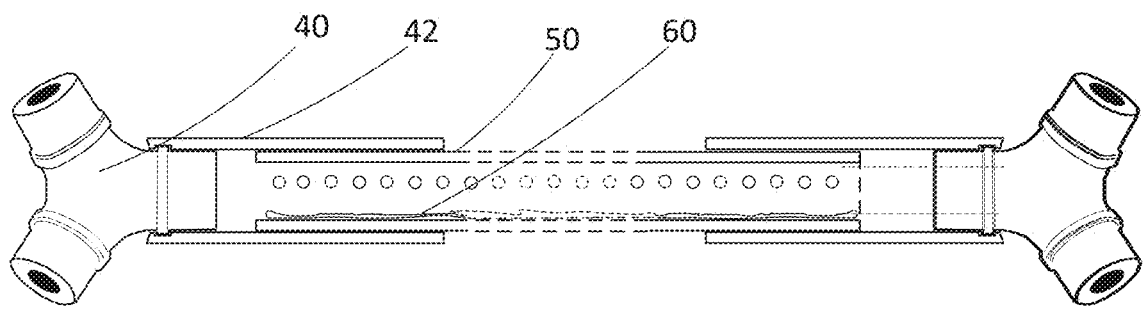
FIGS. 7A-7C show the principle of buoyancy according to the disclosure.
Figure 7B:
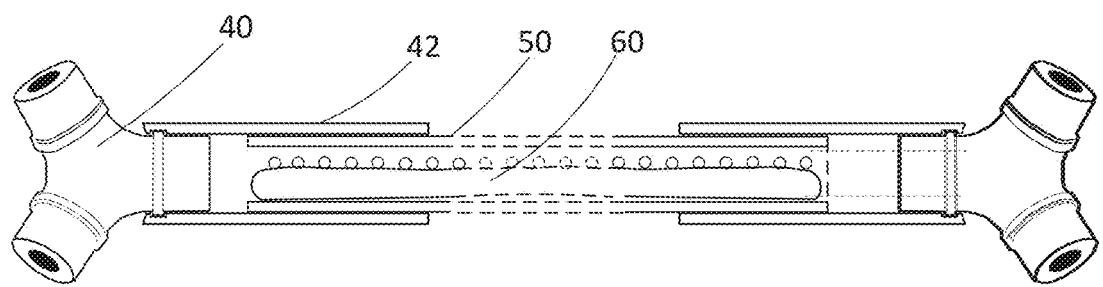
Figure 7C:
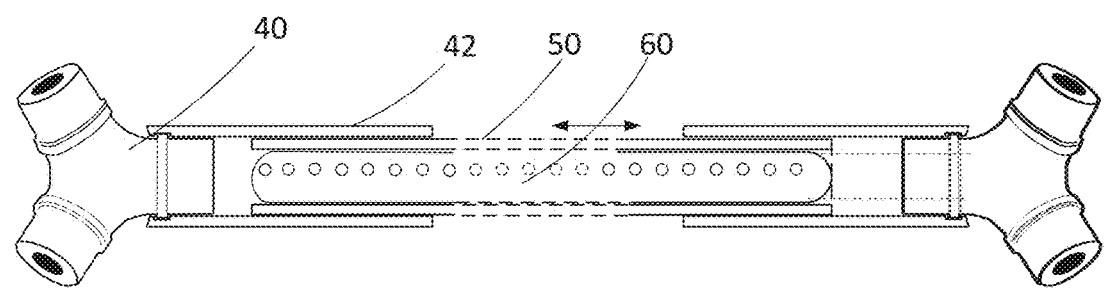
Figure 8:
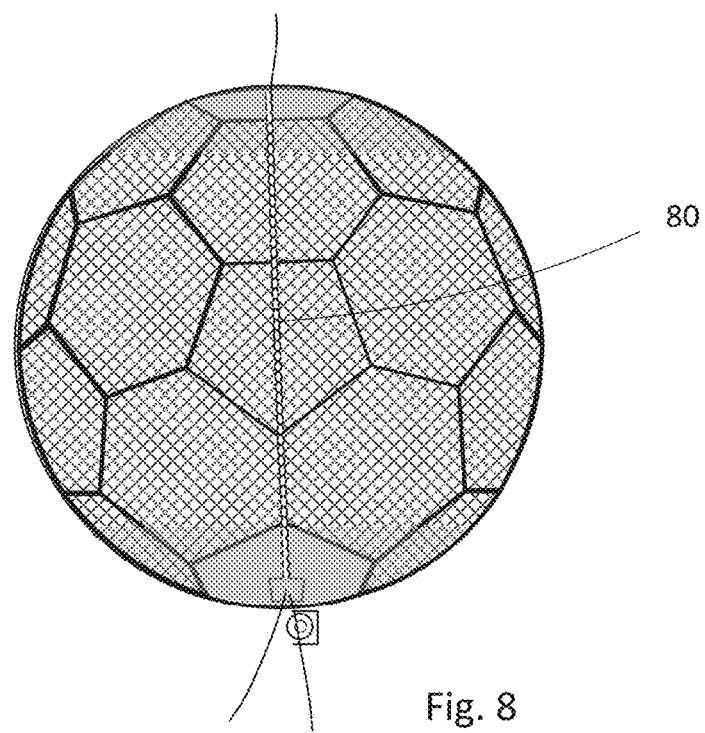
FIG. 8 shows a further feature of a cage according to the disclosure.
Figure 10A:
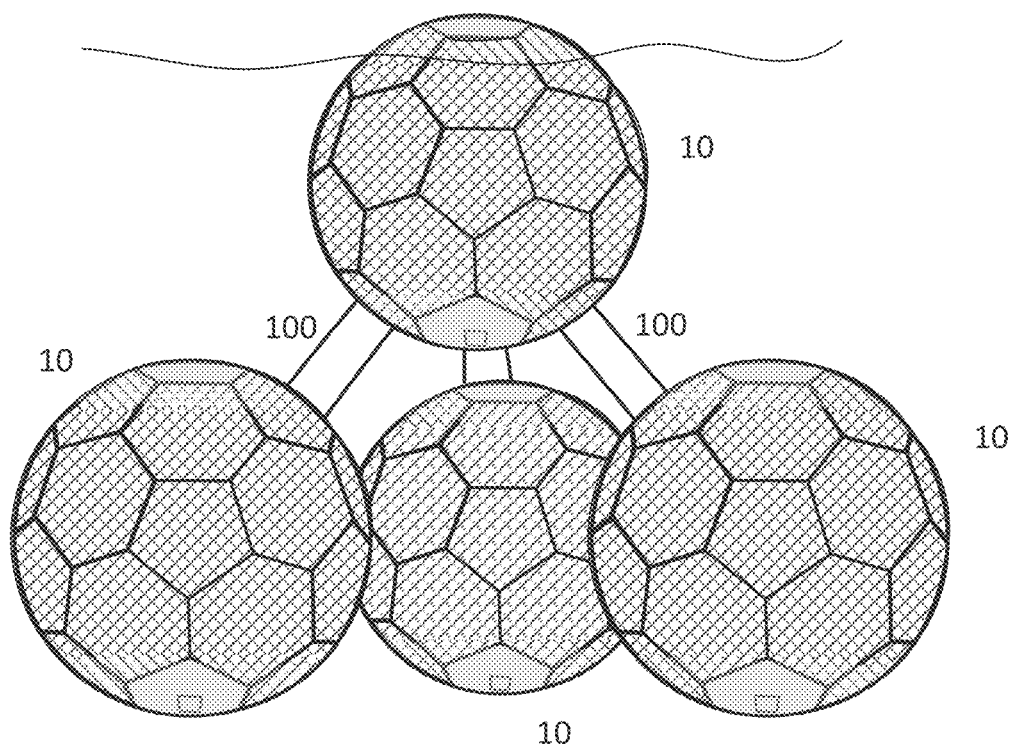
FIGS. 10A-10B show assemblies of several cages according to the disclosure.
Figure 10B:
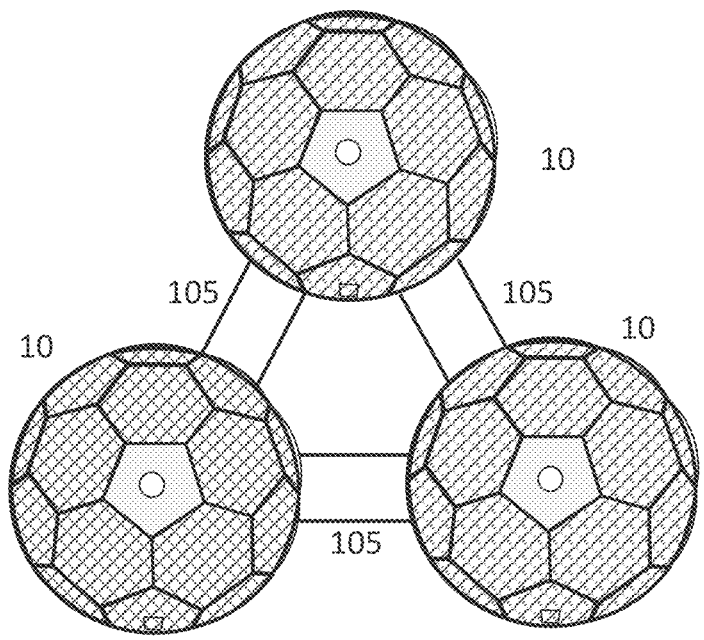
Figure 11:
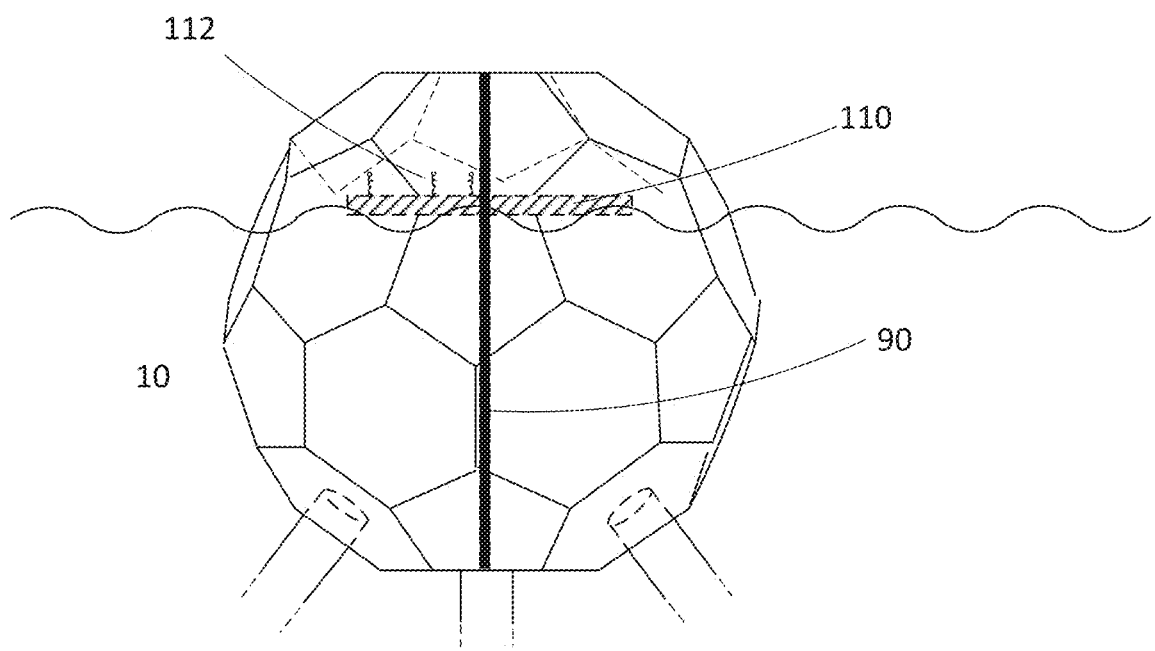
FIG. 11 shows details of a particular variant of the disclosed embodiments.

FIG. 7A schematically shows a (in parti) a side section of a tubular element 11 between two finger brackets 40 with an empty buoyancy element 60 in the pipe. The tubular element 11 is shown with circular perforations. The purpose of the perforations is for water to pass in or out of the tubular element 11 as the buoyancy element is emptied and filled respectively. FIG. 7B shows the same section as FIG. 7A, but with a half-full buoyancy element 60. FIG. 7C again shows the same section as FIGS. 7A and 7B, here with a full buoyancy element 60.

The control unit 33 can be programmed to fill or empty the buoyancy elements in each tubular element 11 individually. Alternatively, the tubular elements 11 can be divided into different zones, so that the buoyancy elements 60 in each individual zone are emptied and filled simultaneously, but independently of emptying and filling of the buoyancy elements in other zones. Both of these options make it possible to make some parts of the cage light and other parts of the cage heavier, so that the whole cage can be rotated in the water so that any part of it is brought above the water surface, for example for maintenance, repair, cleaning or for connection and disconnection of equipment.

The invention claimed is:

1. A closed spherical cage device (10) for farming fish in a position floating in water, comprising:
   a spherical skeleton comprising tubular elements (11) forming boundary lines of a pattern of polygonal panes (13) divided along the boundary lines, the tubular elements thereby forming a spherical skeleton, wherein the plurality of the panes (13) are covered by at least one layer of seine net (51, 52), netting or membrane,
   each of the tubular elements (11) comprises at least one inflatable buoyancy element (60) having a fluid connection to a reservoir of pressurized gas,
   a control unit (33) is arranged to control an amount of gas in the buoyancy elements,
   the tubular elements (11) are connected at nodes (12) via sleeves (42) and finger brackets (40) and are perforated (63) and arranged to let water into parts of the respective tubular element (11) that is not occupied by the at least one buoyancy element (60), and
   at least some of the tubular elements (11) are movable within a respective sleeve (42).

2. The closed, spherical cage device (10) according to claim 1, wherein the sleeves (42) are attached to the finger brackets (40) and arranged to enclose one end of a tubular element without being immobilized relative thereto.

3. The closed, spherical cage device (10) according to claim 1, wherein one pane (13) of the plurality of panes is covered by a rigid bottom plate (15) comprising a fastening device for mooring the cage (10) to the seabed.

4. The closed, spherical cage device (10) according to claim 3, comprising a mooring line (17) or wire connected to a bottom attachment (35) via a winch (31) for mooring.

5. The closed, spherical cage device (10) according to claim 4, wherein the winch (31) is connected to the control unit (33) configured to regulate the length of the mooring line (17) so that the entire cage can be placed at the surface or submerged in a position at the desired depth.

6. The closed, spherical cage device (10) according to claim 5, wherein the control unit (33) is configured to reduce the amount of gas in at least some of the buoyancy elements (60) when the winch (31) shortens the mooring line (17).

7. The closed, spherical cage device (10) according to claim 6, wherein the control unit (33) is also configured to control the winch (31).

8. The closed, spherical cage device (10) according to claim 6, wherein the buoyancy elements (60) are arranged to receive a regulated amount of gas and are divided into zones, allowing the control unit (33) to supply different amounts of gas to different zones to thereby cause the cage to rotate and move vertically or both.

9. The closed, spherical cage device (10) according to claim 1, wherein one pane (13) of the plurality of panes is covered by a rigid top plate (14).

10. The closed, spherical cage device (10) according to claim 1, wherein the plurality of panes include an upper pane and a lower pane of the cage, and the upper pane and the lower pane of the cage are connected by a chain (80) or a pipe (90) for stabilizing the shape of the cage.

11. The closed, spherical cage device (10) according to claim 1, wherein the plurality of the panes (13) are covered with an inner layer (51) and an outer layer (52) of seine net with a diameter of the tubular elements (11) determining a distance between the layers.

12. The closed, spherical cage device (10) according to claim 1, wherein the gas in the reservoir is selected from the group consisting of air, inert gas and combinations thereof.

13. The closed, spherical cage device (10) according to claim 1, wherein the buoyancy elements (60) are arranged to receive a regulated amount of gas and are divided into zones, allowing the control unit (33) to supply different amounts of gas to different zones to thereby cause the cage to rotate and move vertically or both.

14. The closed, spherical cage device (10) according to claim 13, wherein the cage has an upper zone (A) that is lined on its inside with a gas-tight fabric which secures an air pocket in an upper part of the cage in cases wherein the cage is pulled down under water in its entirety.

15. The closed, spherical cage device (10) according to claim 13, wherein the zones comprise a lower zone (B) that is covered by an impervious fabric configured to collect solid waste, comprising a drain hose (23) connected to a hatch (18) in a portion of the impervious fabric configured to periodically empty the waste from the cage to a vessel or to a tank at the sea floor.

16. The closed, spherical cage device (10) according to claim 1, wherein the cage has an upper zone (A) that is lined on its inside with a gas-tight fabric which secures an air pocket in an upper part of the cage in cases wherein the cage is pulled down under water in its entirety.

17. The closed, spherical cage device (10) according to claim 16, wherein the cage has a lower zone (B) that is covered by an impervious fabric configured to collect solid waste, comprising a drain hose (23) connected to a hatch (18) in a portion of the impervious fabric configured to periodically empty the waste from the cage to a vessel or to a tank at the sea floor.

18. The closed, spherical cage device (10) according to claim 1, wherein the cage has a lower zone (B) that is covered by an impervious fabric configured to collect solid waste, comprising a drain hose (23) connected to a hatch (18) in a portion of the impervious fabric configured to periodically empty the waste from the cage to a vessel or to a tank at the sea floor.

19. The closed spherical cage device according to claim 1, wherein the cage (10) further comprises a platform (110) arranged to support one or more people in the cage.

20. An assembly of closed spherical cages, comprising:
two or more cages (10) of claim 1, wherein
two or more of the two or more cages (10) are interconnected by channels (100, 105) which can be opened and closed as required.

* * * * *